United States Patent
Lee

(10) Patent No.: US 8,120,685 B2
(45) Date of Patent: Feb. 21, 2012

(54) CMOS IMAGE SENSORS AND METHODS FOR OUTPUTTING PIXEL DATA AT HIGH SPEEDS

(75) Inventor: Dong Hun Lee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 680 days.

(21) Appl. No.: 12/314,512

(22) Filed: Dec. 11, 2008

(65) Prior Publication Data

US 2009/0153711 A1 Jun. 18, 2009

(30) Foreign Application Priority Data

Dec. 18, 2007 (KR) .................... 10-2007-0133199

(51) Int. Cl.
*H04N 5/374* (2011.01)
*H04N 5/335* (2011.01)
*H01L 27/00* (2006.01)
(52) U.S. Cl. ............... 348/308; 348/302; 250/208.1
(58) Field of Classification Search ............ 250/208.1; 348/294, 302, 305, 308
See application file for complete search history.

(56) References Cited

U.S. PATENT DOCUMENTS

2011/0176045 A1* 7/2011 Ahn et al. .................. 348/308

FOREIGN PATENT DOCUMENTS

| JP | 2000-152085 | 5/2000 |
| JP | 2001-251557 | 9/2001 |
| KR | 10-2002-0094607 | 12/2002 |
| KR | 10-2004-0065516 | 7/2004 |

* cited by examiner

*Primary Examiner* — David N Spector
(74) *Attorney, Agent, or Firm* — Harness, Dickey & Pierce, P.L.C.

(57) ABSTRACT

A The CMOS image sensor includes a pixel array including pixels arranged in a matrix of rows and columns and a row selection unit configured to generate selection signals for simultaneously or concurrently selecting at least two rows from the rows of the pixel array in response to a received row address. An analog-to-digital conversion unit is configured to convert pixel data output from the at least two rows selected from the pixel array into a digital video signal and output the digital video signal. The pixel array outputs the pixel data in response to the selection signals.

20 Claims, 11 Drawing Sheets

FIG. 2

|  | FIRST COLUMN | SECOND COLUMN | THIRD COLUMN | FOURTH COLUMN | FIFTH COLUMN | SIXTH COLUMN | |
|---|---|---|---|---|---|---|---|
| FIRST ROW | P11 | P12 | P13 | P14 | P15 | P16 | ••••• |
| SECOND ROW | P21 | P22 | P23 | P24 | P25 | P26 | ••••• |
| THIRD ROW | P31 | P32 | P33 | P34 | P35 | P36 | ••••• |
| FOURTH ROW | P41 | P42 | P43 | P44 | P45 | P46 | ••••• |
| FIFTH ROW | P51 | P52 | P53 | P54 | P55 | P56 | ••••• |
| SIXTH ROW | P61 | P62 | P63 | P64 | P65 | P66 | ••••• |

CMOS IMAGE SENSORS AND METHODS FOR OUTPUTTING PIXEL DATA AT HIGH SPEEDS

PRIORITY STATEMENT

This non-provisional U.S. patent application claims priority under 35 U.S.C. §119 to Korean Patent Application No. 10-2007-0133199 filed on 18 Dec. 2007 in the Korean Intellectual Property Office (KIPO), the entire contents of which is incorporated herein by reference.

BACKGROUND

1. Technical Field

Example embodiments relate to CMOS image sensors, for example, to CMOS image sensors capable of outputting pixel data at a relatively high speeds and image sensing methods thereof.

2. Description of Related Art

Conventional image sensors include charge-coupled devices (CCDs) and complementary metal oxide semiconductor (CMOS) image sensors (CISs). A CIS is more economical than a CCD because the CIS can be manufactured using conventional CMOS processes. A CIS is also advantageous with respect to integration density because analog and digital signal processing circuits can be integrated into the CIS. In addition, because a CIS can be adapted to relatively low-power-low-voltage design, it is more widely used in portable devices such as mobile phones, digital cameras, personal digital assistants (PDAs), and the like, which require relatively low power consumption. A pixel array of a conventional CIS includes a plurality of pixels arranged in a two-dimensional matrix of rows and columns and each pixel outputs an image signal in response to incident light energy.

SUMMARY

Example embodiments provide complementary metal oxide semiconductor (CMOS) image sensors and imaging sensing methods capable of outputting pixel data at relatively high speeds and image sensing methods for the same.

Example embodiments provide image sensors, image sensing systems and image sensing methods capable of outputting digital video signals (and resultant video signals) at higher speeds (e.g., speeds suitable for use in a camera, a mobile terminal, etc.), which may improve quality of displayed images and/or effects of image smearing.

At least one example embodiment provides an image sensor. The image sensor may include a pixel array having pixels arranged in a matrix of rows and columns, a row selection unit configured to generate selection signals for simultaneously or concurrently selecting at least two rows from the rows of the pixel array in response to a received a row address, and an analog-to-digital conversion unit configured to convert pixel data output from the at least two rows selected from the pixel array into a digital video signal. The analog-to-digital converter may also be configured to output the digital video signal. The pixel array may output the pixel data in response to the selection signals.

According to at least some example embodiments the row selection unit may include a plurality of row drivers. Each of the plurality of row drivers may be configured to output selection signals for concurrently or simultaneously selecting at least two rows from one of a plurality of areas of the pixel array. The analog-to-digital conversion unit may include a plurality of analog-to-digital converters. Each of the plurality of analog-to-digital converters may be configured to convert pixel data generated from a column included in a corresponding area of the plurality of areas of the pixel array into a digital video signal. The conversion by the analog-to-digital converter units may be performed sequentially in a column direction.

According to at least some example embodiments, the row selection unit may include a first row driver configured to select a first row from the rows of the pixel array; and a second row driver configured to select a second row from the rows of the pixel array simultaneously or concurrently when the first row driver selects the first row. The first row may be an odd row and the second row may be an even row. The first row driver and the second row driver may be disposed around the pixel array to face each other.

The pixel data may include first pixel data and second pixel data and the digital video signal may include a first digital video signal and a second digital video signal. The analog-to-digital conversion unit may include: a first analog-to-digital converter unit configured to convert the first pixel data output from the first row into the first digital video signal and output the first digital video signal; and a second analog-to-digital converter unit configured to convert the second pixel data output from the second row into the second digital video signal and output the second digital video signal.

According to at least some example embodiments, the analog-to-digital conversion unit may be configured to: convert the first pixel data output from a first row among the at least two selected rows into the first digital video signal, output the first digital video signal, convert the second pixel data output from a second row among the at least two selected rows into the second digital video signal, and output the second digital video signal. The analog-to-digital conversion unit may perform analog-to-digital conversion of the pixel data output from the pixel array sequentially or alternately in a column direction. The number of analog-to-digital converter units may be less than or equal to a number of the columns of the pixel array.

According to at least some example embodiments, the pixel array may include a plurality of pixel array areas. Each of the plurality of pixel array areas may have a corresponding row selection unit and analog-to-digital conversion unit. Each row selection unit may be configured to generate selection signals for concurrently or simultaneously selecting at least two rows from the rows of a corresponding pixel array area in response to a received row address. Each analog-to-digital conversion unit may be configured to convert pixel data output from the at least two rows selected from the corresponding pixel array area into a corresponding digital video signal and output the digital video signal.

At least one example embodiment provides image sensing method for image sensor. The image sensing method may include generating selection signals for concurrently or simultaneously selecting at least two rows from a plurality of rows of a pixel array in response to a received row address, the pixel array including a plurality of pixels arranged in a matrix of rows and columns; outputting pixel data in response to the selection signals; converting the output pixel data into a digital video signal; and outputting the digital video signal.

The selection signals are signals for concurrently or simultaneously selecting at least two rows from one of a plurality of areas of the pixel array. The digital video signal is converted pixel data, generated from a column included in a corresponding area among a plurality of areas of the pixel array.

BRIEF DESCRIPTION OF THE DRAWINGS

The present invention will become more apparent by describing in detail example embodiments thereof with reference to the attached drawings in which:

FIG. 2 illustrates a pixel array of the CIS shown in FIG. 1;

DETAILED DESCRIPTION OF EXAMPLE EMBODIMENTS

Figure 1:
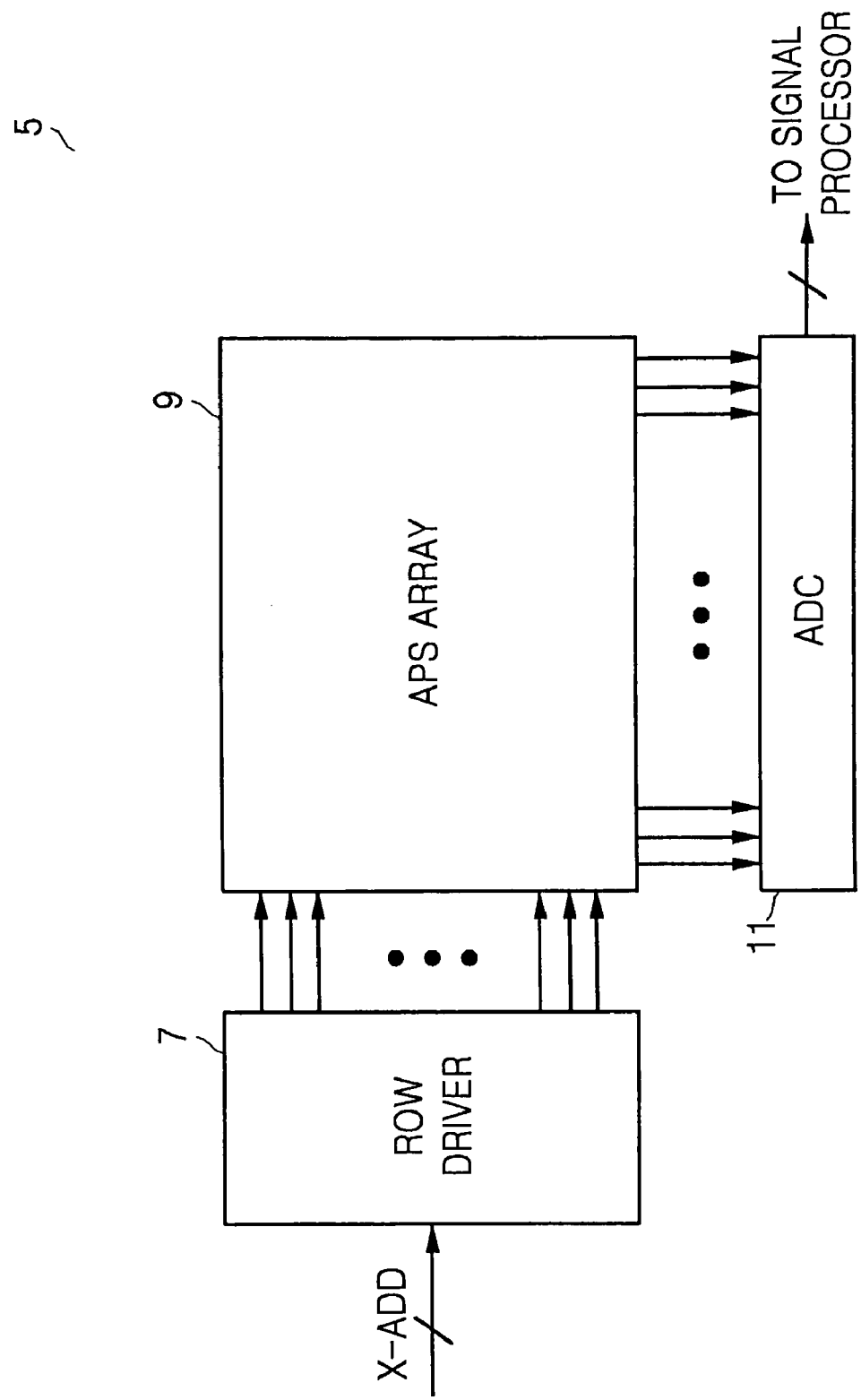
FIG. 1 is a block diagram of a CMOS image sensor (CIS) according to related art.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a CMOS image sensor (CIS) according to related art. FIG. 2 illustrates a pixel array of the CIS shown in FIG. 1.

Referring to FIGS. 1 and 2, the CIS 5 includes a row driver 7, a pixel array 9, and an analog-to-digital converter (ADC) 11. The pixel array 9 includes pixels P11 through P66 arranged in a matrix of rows and columns.

In operation, the row driver 7 receives a row address X-ADD and generates a selection signal in response to the received row address X-ADD. The pixel array 9 outputs pixel data of a pixel among the pixels P11 through P66 in response to the selection signal from the row driver 7. The ADC 11 converts the pixel data output from the pixel array 9 into a digital video signal and outputs the digital video signal to a signal processor (not shown).

Recently, demand for relatively high pixel density, high resolution, high picture quality and high speed of image sensors has increased. A conventional CIS, such as CIS 5 in FIG. 1, uses relatively high operating frequencies when converting pixel data from an analog format to a digital format to output a video signal at a sufficiently high speed. However, when these high operating frequencies are used, the circuit structure of the ADC 11 becomes more complicated and the area of the ADC 11 increases. Moreover, in outputting pixel data from the pixel array 9 in the conventional CIS 5, the row driver 7 selects only a single row (e.g., a first row) from a plurality of rows (e.g., first to sixth rows) included in the pixel array 9. The ADC 11 then converts pixel data output from pixels P11, P12, . . . , P16 on the single selected row (e.g., the first row) into a digital video signal before selecting a subsequent row. Because the conventional CIS 5 outputs the digital image signal based on a selection signal, which selects only a single row, the conventional CIS 5 cannot satisfy the increased demand for outputting high-speed pixel data.

Figure 3:
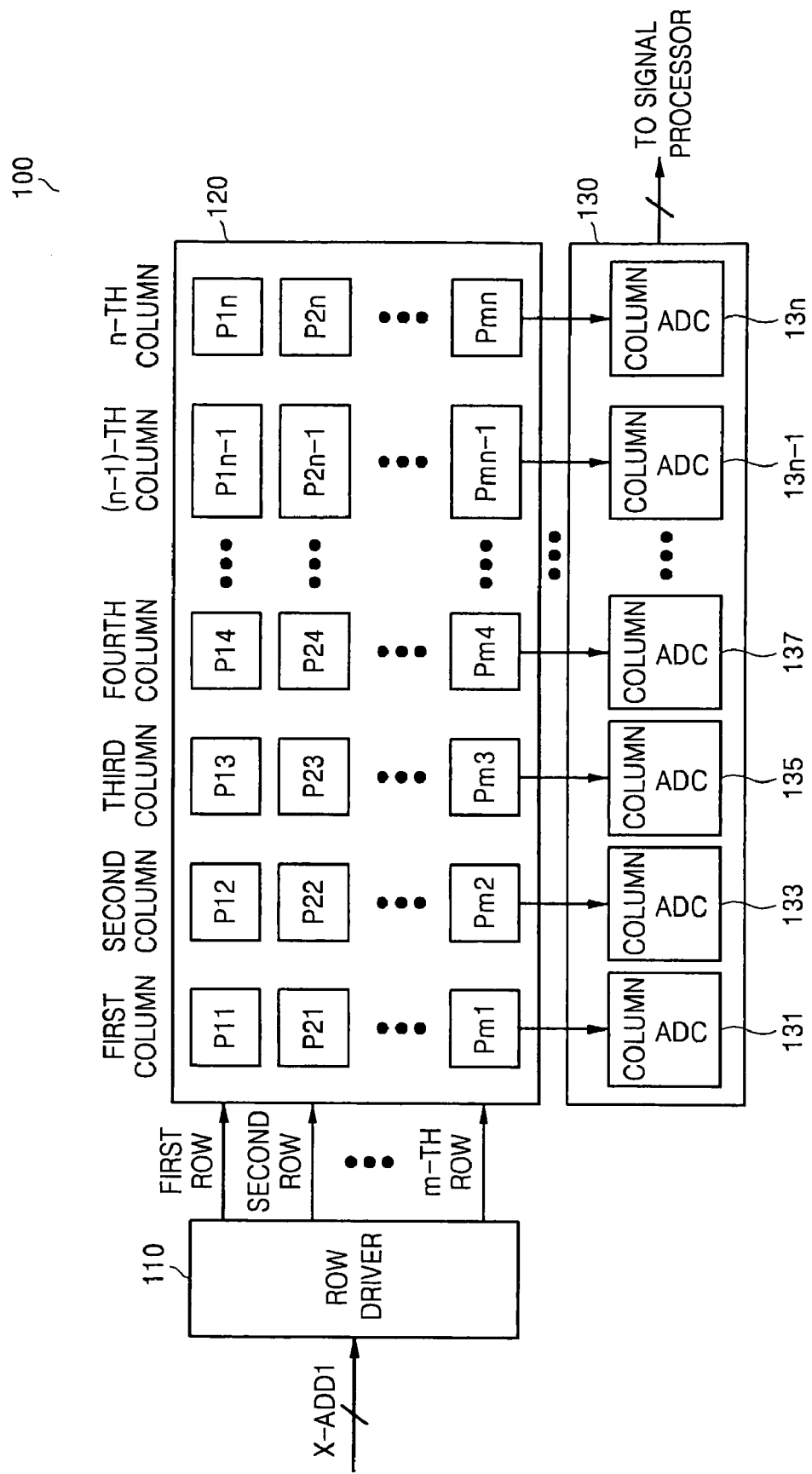
FIG. 3 is a block diagram of a CIS according to an example embodiment.

FIG. 3 is a block diagram of a complementary metal oxide semiconductor (CMOS) image sensor (CIS) 100 according to an example embodiment. The CIS 100, which may be implemented in an image system such as a camera, mobile terminal, smartphone, personal digital assistant (PDA), etc., includes a row driver (or a row selection unit) 110, a pixel array 120, and an analog-to-digital converter (ADC) 130.

The row driver 110 receives a row address X-ADD1 generated by a controller (not shown) and generates selection signals for simultaneously (or concurrently) selecting at least two rows of the pixel array 120 in response to the received row address X-ADD1. For example, the row driver 110 may generate selection signals for simultaneously (or concurrently) selecting first and second rows of the pixel array 120 in response to the row address X-ADD1. In another example, the row driver 110 may generate selection signals for simultaneously (or concurrently) selecting first, second and m-th rows of the pixel array 120.

The pixel array 120 includes pixels P11 through Pmn arranged in a matrix of first through m-th rows and first through n-th columns. The pixel array 120 may output pixel data from pixels among the pixels P11 through Pmn corresponding to the selection signals output from the row driver 110. A color filter may be disposed above the pixel array 120. The color filter enables each of the pixels P11 through Pmn to receive only light of a given, desired or predetermined color.

The color filter may have a Bayer pattern or similar arrangement. For example, red (R) and green (G) color patterns may be alternately arranged on an odd row (e.g., the first row) of the pixel array 120 and G and blue (B) color patterns may be alternately arranged on an even row (e.g., the second row).

The ADC 130 may convert pixel data output from the pixel array 120 into a digital video signal. The digital video signal of the ADC 130 may be transmitted to a signal processor (not shown). The signal processor may output video signals based on the digital video signal. A procedure in which the signal processor outputs the video signals based on the digital video signal is well known to those skilled in the art. Thus, a detailed description thereof will be omitted.

The ADC 130 includes a plurality of column ADC blocks or units 131 through 13n. Each of the column ADC units 131 through 13n may convert pixel data output from pixels of a corresponding column into a digital video signal. For example, assuming that the pixel data includes first pixel data and second pixel data and the digital video signal includes a first digital video signal and a second digital video signal, when the first row and the second row are simultaneously (or concurrently) selected by the row driver 110 from among the first through m-th rows of the pixel array 120, the first column ADC unit 131 among the column ADC units 131 through 13n converts the first pixel data from a first pixel P11 of the first row into the first digital video signal, and then converts the second pixel data from a second pixel P21 of the second row into the second digital video signal. In this example, the first column ADC unit 131 may include a switch (not shown) and a latch circuit (not shown) to latch or buffer the second pixel data while converting the first pixel data into the first digital video signal. After outputting the first digital video signal, the first column ADC unit 131 converts the second pixel data that has been latched into the second digital video signal and outputs the second digital video signal.

The CIS 100 according to at least this example embodiment simultaneously or concurrently selects at least two rows of the pixel array 120 and decodes pixel data from the at least two rows, thereby decoding pixel data faster than a conventional CIS such as the CIS 5 shown in FIG. 1. In this example embodiment, the number of the column ADC units 131 through 13n may be less than or equal to the number of the first through n-th columns of the pixel array 120.

When the number of the column ADC units 131 through 13n is the same as the number of first through n-th columns, the column ADC units 131 through 13n may correspond to the first through n-th columns, respectively, and each of the column ADC units 131 through 13n may convert data from pixels of a corresponding column among the first through n-th columns. For example, the first column ADC unit 131 may convert pixel data output from the pixels P11 through Pm1 of the first column into a digital video signal, the second column ADC unit 132 may convert pixel data output from the pixels P12 through Pm2 of the second column into a digital video signal, and so on.

When the number of the column ADC units 131 through 13n is less than the number of the first through n-th columns, each of the column ADC units 131 through 13n may convert pixel data output from pixels of at least two columns into a digital video signal. For example, the first column ADC unit 131 may convert pixel data output from the pixels P11 through Pm1 of the first column and/or pixel data output from the pixels P12 through Pm2 of the second column into a digital video signal.

The ADC 130 may sequentially perform analog-to-digital conversion of pixel data output from the pixel array 120 in a column direction in which a column increases (e.g., in a direction from the pixel P11 to the pixel P1n when the first row is selected). Alternatively, the ADC 130 may perform analog-to-digital conversion of pixel data output from the pixel array 120 alternately in the column direction. For example, the ADC 130 may perform the analog-to-digital conversion of pixel data stored in pixels of even or odd columns sequentially. In another alternative, the ADC 130 may skip at least one column when performing the analog-to-digital conversion of pixel data, thereby performing binning, sampling, and/or subsampling.

The ADC 130 may further include a correlated double sampling (CDS) block (not shown). The CDS block may receive a reset signal and a sensing signal from the pixel array 120, perform CDS on the reset signal and the sensing signal, and generate CDS signals. Each of the column ADC units 131 through 13n may convert the signals output from the CDS block into digital video signals.

Figure 4:
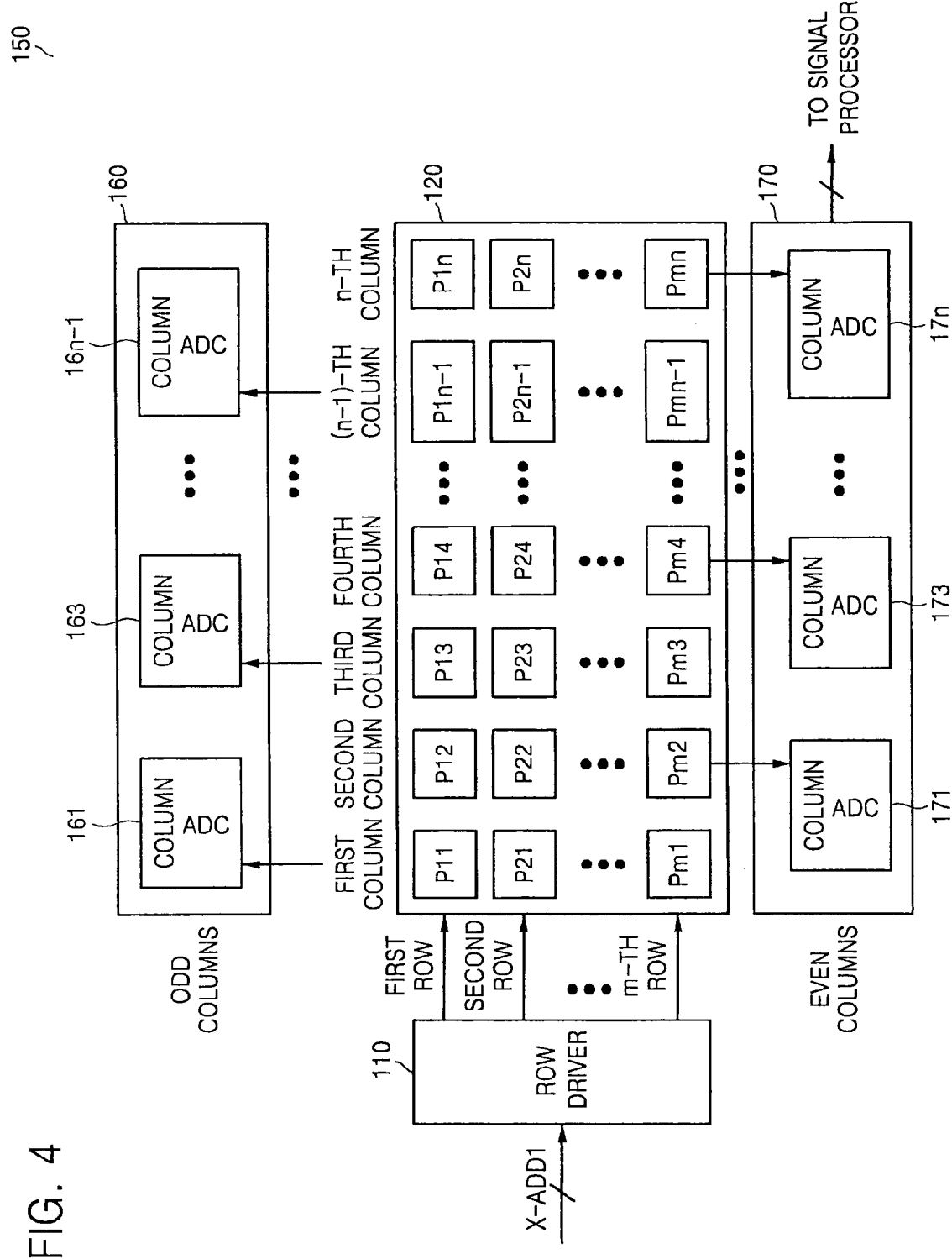
FIG. 4 is a block diagram of a CIS according to another example embodiment.

FIG. 4 is a block diagram of a CIS 150 according to another example embodiment. The CIS 150 illustrated in FIG. 4 is similar to the CIS 100 in FIG. 3, except that the CIS 150 includes a plurality of ADCs. Each ADC may convert pixel data generated from corresponding columns among the first through n-th columns of the pixel array 120 into a digital video signal. The plurality of ADCs includes at least a first ADC 160 and a second ADC 170. The first ADC 160 may convert pixel data output from only odd columns among the first through n-th columns of the pixel array 120 into a digital video signal, whereas the second ADC 170 may convert pixel data output from only even columns among the first through n-th columns of the pixel array 120 into a digital video signal.

The first ADC 160 includes a first group column ADC units 161, 163, . . . 16n-1. Each column ADC unit 161, 163, . . . 16n—1 may convert pixel data output from a corresponding odd column among the odd columns (e.g., the first, third, and (n-1)-th columns) of the pixel array 120 into a digital video signal. The second ADC 170 includes a second group column ADC units 172, 174, . . . 17n. Each column ADC unit 172, 174, . . . 17n may convert pixel data output from a corresponding even column among the even columns (e.g., the second, fourth, and n-th columns) of the pixel array 120 into a digital video signal.

The operation of the first and second group column ADC units 161 through 16n-1 and 172 through 17n may be the same as or similar to that of the column ADC units 131 through 13n illustrated in FIG. 3. Thus, a detailed description thereof will be omitted. Accordingly, the CIS 150 according to at least this example embodiment simultaneously (or concurrently) selects at least two rows of the pixel array 120 and decodes pixel data from the at least two rows, thereby decoding the pixel data at least two times faster than a conventional CIS such as the CIS 5 shown in FIG. 1. Similar to the ADC 130 illustrated in FIG. 3, each of the ADCs 160 and 170 may further include a CDS block (not shown).

Figure 5:
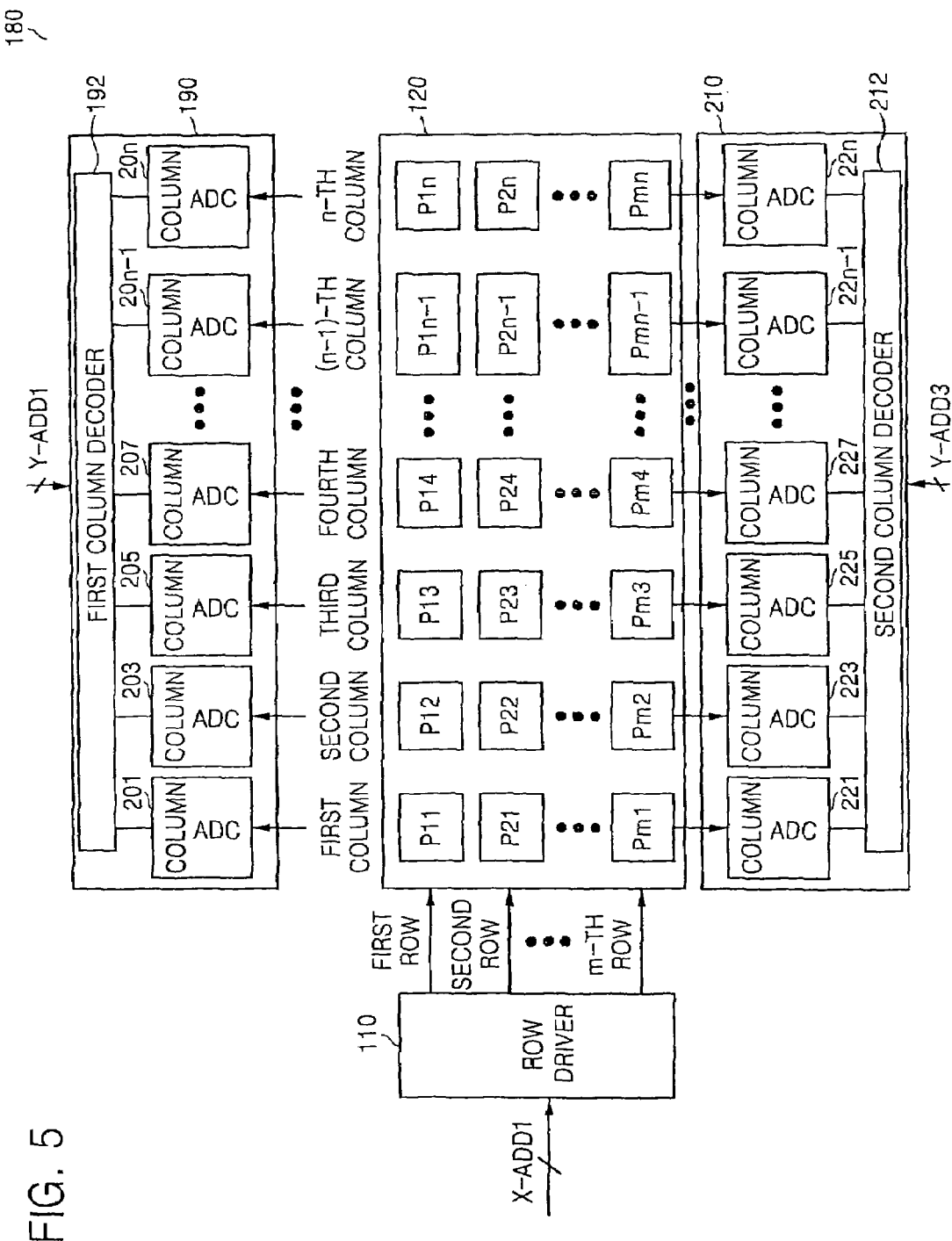
FIG. 5 is a block diagram of a CIS according to yet another example embodiment.

FIG. 5 is a block diagram of a CIS 180 according to yet another example embodiment. The CIS 180 is similar to the CIS 100, but further includes a first ADC 190 and a second ADC 210 in addition to the row driver 110 and the pixel array 120 illustrated in FIG. 3. Because the row driver 110 and the pixel array 120 have been described in detail with reference to FIG. 3, a detailed description thereof will be omitted.

The first ADC 190 may convert pixel data from pixels in a row, from among the first through m-th rows of the pixel array 120, selected according to a first selection signal from the row driver 110 into a digital video signal. The first ADC 190 includes a first column decoder 192 and first group column ADC units 201 through 20n. The first column decoder 192 enables corresponding column ADC units among the first group column ADC units 201 through 20*n* in response to a first column address signal Y-ADD1 generated by a controller (not shown). Each of the first group column ADC units 201 through 20*n* may be enabled by the first column decoder 192 and convert pixel data of one of the pixels in the row selected according to the first selection signal from by the row driver 110 into a digital video signal.

The second ADC 210 may convert pixel data from pixels in a row, from among the first through m-th rows of the pixel array 120, selected according to a second selection signal from the row driver 110 into a digital video signal. The second ADC 210 includes a second column decoder 212 and second group column ADC units 221 through 22*n*. The second column decoder 212 enables corresponding column ADC units among the second group column ADC units 221 through 22*n* in response to a second column address signal Y-ADD3 from the controller. Each of the second group column ADC units 221 through 22*n* may be enabled by the second column decoder 212 and convert pixel data from one of the pixels in the selected row into a digital video signal. Accordingly, the CIS 180 according to this example embodiment simultaneously (or concurrently) selects at least two rows of the pixel array 120 and decodes pixel data from the at least two rows, thereby decoding the pixel data at least two times faster than a conventional CIS such as the CIS 5 shown in FIG. 1. Similar to the ADC 130 illustrated in FIG. 3, each of the first and second ADCs 190 and 210 may further include a CDS block (not shown).

Figure 6:
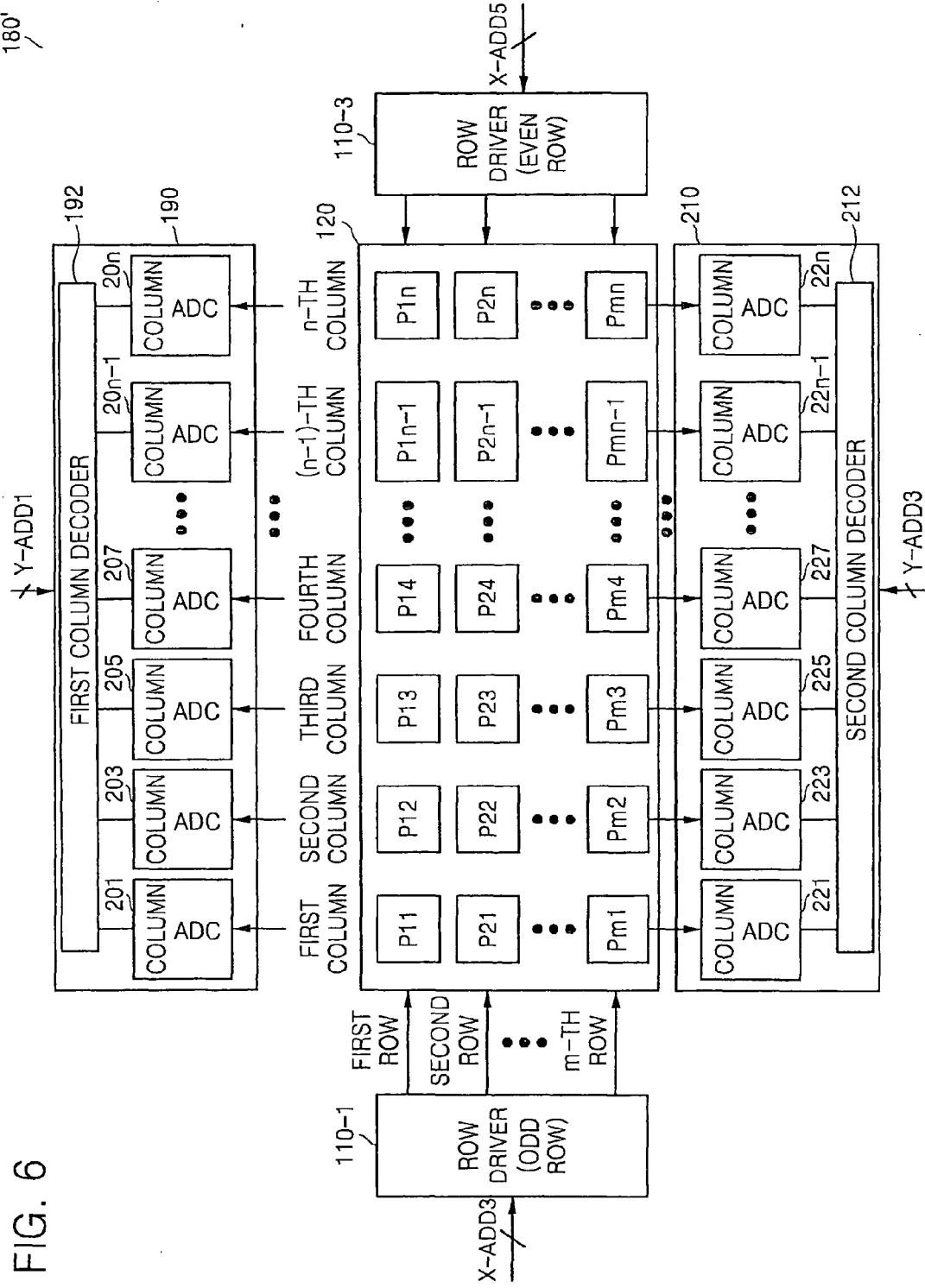
FIG. 6 is a block diagram of a CIS according to another example embodiment.

FIG. 6 is a block diagram of a CIS 180' according to another example embodiment. The CIS 180' illustrated in FIG. 6 is similar to the CIS 180 in FIG. 5, but includes a plurality of row drivers 110-1 and 110-3 rather than a single row driver 110 as illustrated in FIG. 5.

Each of the row drivers 110-1 and 110-3 selects a row from the first through m-th rows included in the pixel array 120 corresponding to a received row address X-ADD3 or X-ADD5. For example, the first row driver 110-1 may select one row (e.g., an odd row) from the first through m-th rows in response to the first row address X-ADD3. The second row driver 110-3 may select another row (e.g., an even row) from the first through m-th rows in response to the second row address X-ADD5. Accordingly, the CIS 180' according to at least this example embodiment, simultaneously (or concurrently) selects at least two rows of the pixel array 120 and decodes pixel data from the at least two rows, thereby decoding the pixel data at least two times faster than a conventional CIS such as the CIS 5 shown in FIG. 1.

In the example embodiment shown in FIG. 6, the row drivers 110-1 and 110-3 and the first and second ADCs 190 and 210 are arranged symmetrically with respect to the pixel array 120. Accordingly, the pixel array 120 is disposed at the center of the CIS 180', so that a more stable layout may be achieved during design of an image sensing system.

Figure 7:
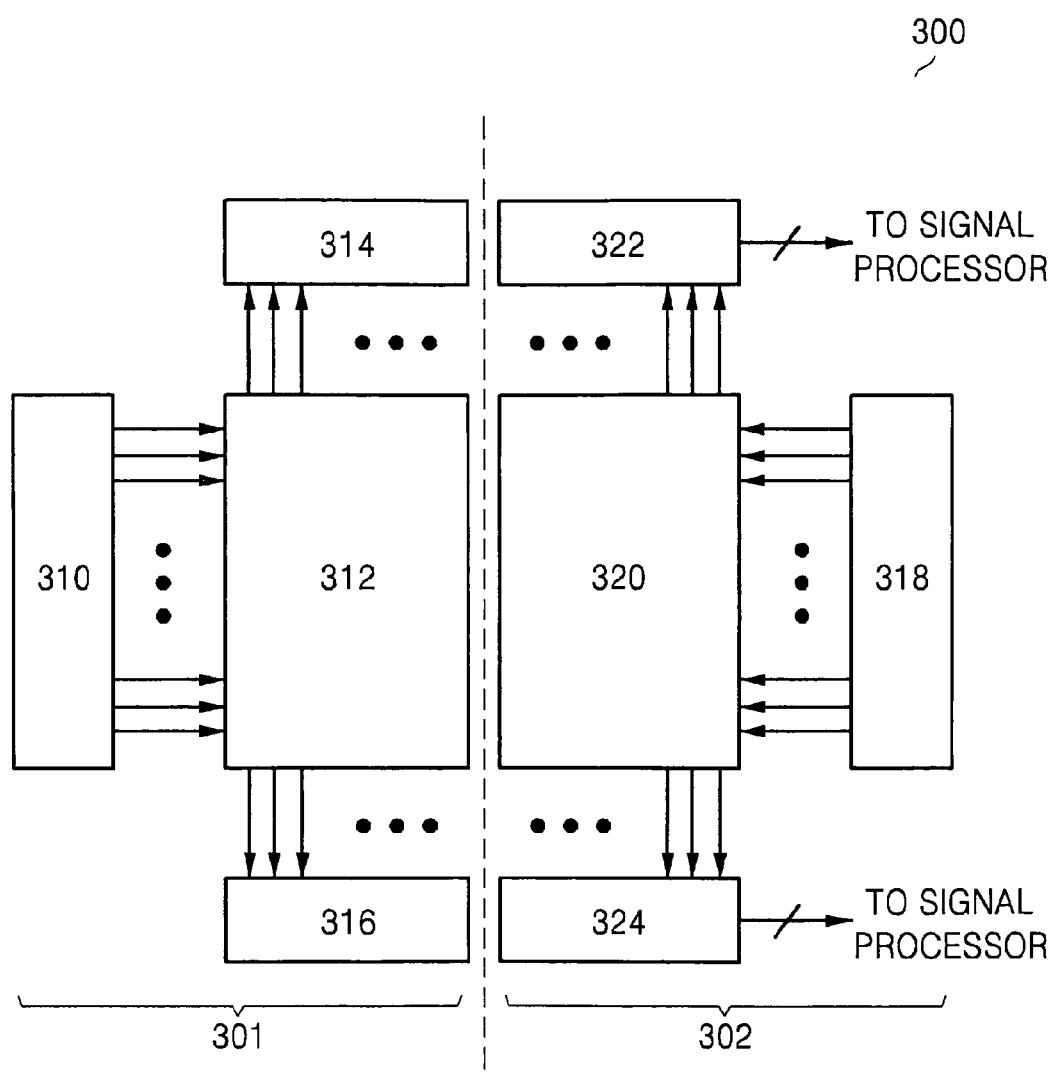
FIG. 7 is a block diagram of a CIS according to yet another example embodiment.

FIG. 7 is a block diagram of a CIS 300 according to another example embodiment. Referring to FIG. 7, the CIS 300 includes a first image sensing unit 301 and a second image sensing unit 302.

The first image sensing unit 301 may decode pixel data generated from a first pixel array area 312, which constitutes a first portion of a pixel array. The first image sensing unit 301 includes a first row driver 310, the first pixel array area 312, a first ADC 314, and a second ADC 316. The first row driver 310 performs functions that are the same as or similar to those of the row driver 110 illustrated in FIG. 5. For example, the first row driver 310 may generate selection signals for simultaneously (or concurrently) selecting at least two rows from a plurality of rows included in the first pixel array area 312 in response to a first row address generated from a controller (not shown). The first pixel array area 312 may output pixel data generated by pixels of at least two rows in response to the selection signals. The first ADC 314 may convert first pixel data from pixels of one row (e.g., an odd row) among the at least two rows into a first digital video signal.

The second ADC 316 may convert second pixel data generated by pixels of another row (e.g., an even row) among the at least two rows into a second digital video signal. The first digital video signal and the second digital video signal may be transmitted to a signal processor (not shown) and the signal processor may output video signals based on the first and second digital video signals.

The second image sensing unit 302 may decode pixel data generated by a second pixel array area 320, which constitutes a second (another) portion of the pixel array. The second image sensing unit 302 includes a second row driver 318, the second pixel array area 320, a third ADC 322, and a fourth ADC 324. The second row driver 318 performs functions that are the same as or similar to those of the row driver 110 illustrated in FIG. 5. For example, the second row driver 318 may generate selection signals for simultaneously (concurrently) selecting at least two rows from a plurality of rows included in the second pixel array area 320 in response to a second row address from a controller (not shown). The second pixel array area 320 may output pixel data generated by pixels of at least two rows in response to the selection signals. The third ADC 322 may convert third pixel data generated from pixels of one row (e.g., an odd row) among the at least two rows into a third digital video signal. The fourth ADC 324 may convert fourth pixel data generated by pixels of another row (e.g., an even row) among the at least two rows into a fourth digital video signal. The third digital video signal and the fourth digital video signal may be transmitted to a signal processor (not shown) and the signal processor may output video signals based on the third and fourth digital video signals.

Accordingly, the CIS 300 simultaneously (or concurrently) selects at least two rows from each of the pixel array areas 312 and 320 and decodes pixel data from the at least two rows, thereby decoding the pixel data faster than a conventional CIS such as the CIS 5 shown in FIG. 1.

The row drivers 310 and 318 and the first through fourth ADCs 314, 316, 322, and 324 are arranged symmetrically with respect to the pixel array (312 and 320). Accordingly, the pixel array (312 and 320) is disposed at the center of the CIS 300, so that a more stable layout is achieved during the design of an image sensing system.

Figure 8:
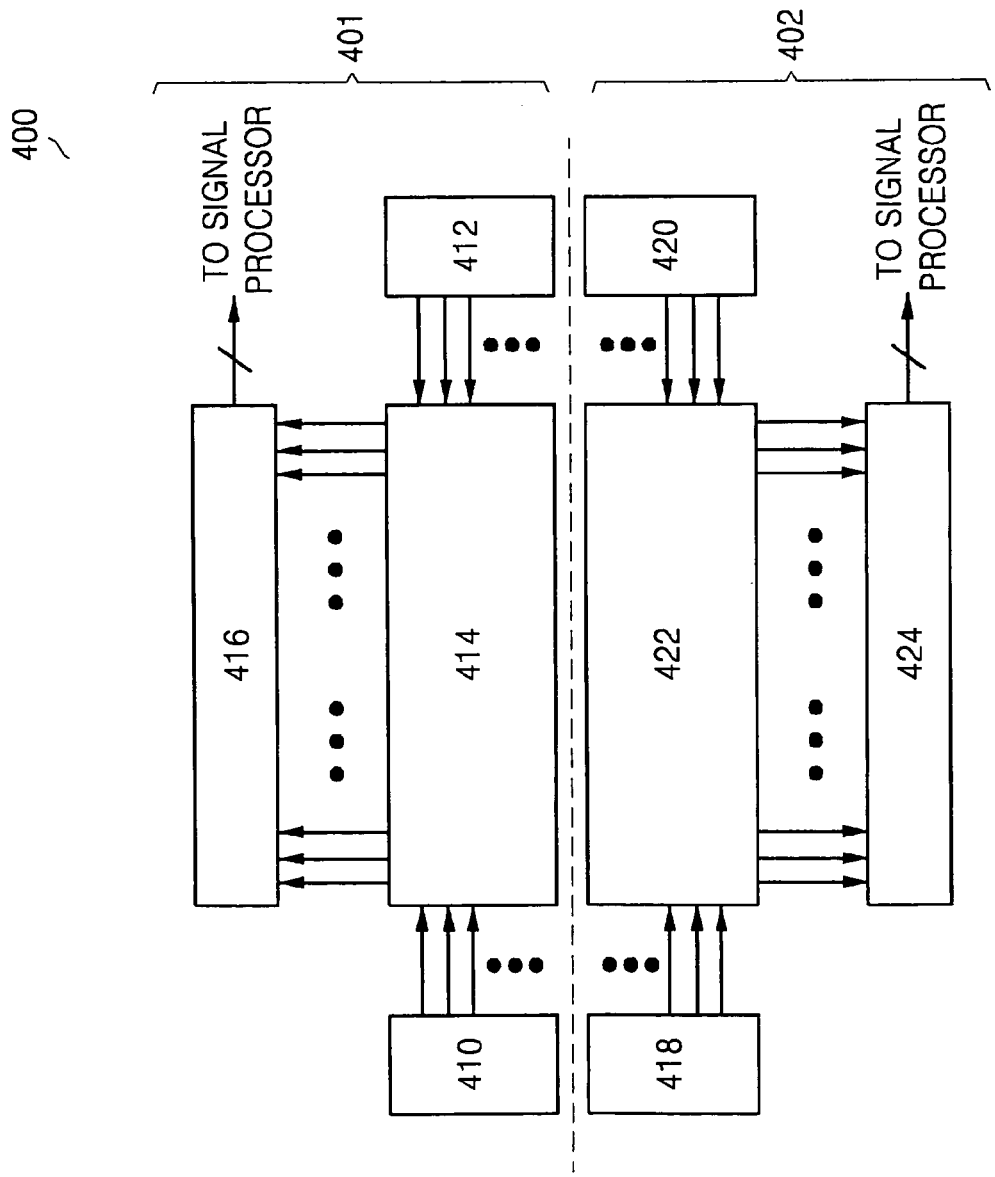
FIG. 8 is a block diagram of a CIS according to still another example embodiment.

FIG. 8 is a block diagram of a CIS 400 according to yet another example embodiment. Referring to FIG. 8, the CIS 400 includes a first image sensing unit 401 and a second image sensing unit 402.

The first image sensing unit 401 may decode pixel data generated by a first pixel array area 414. The first pixel array area 414 constitutes a first portion of a pixel array. The first image sensing unit 401 includes a first row driver 410, a second row driver 412, the first pixel array area 414, and a first ADC 416.

The first row driver 410 may generate a first selection signal for selecting a row (e.g., an odd row) from a plurality of rows included in the first pixel array area 414 in response to a first row address generated by a controller (not shown). The second row driver 412 may generate a second selection signal for selecting another row (e.g., an even row) from rows included in the first pixel array area 414 in response to a second row address generated by a controller (not shown). The first pixel array area 414 may output pixel data generated from pixels in at least two rows (e.g., an odd row and an even row) in response to the first and second selection signals.

The first ADC 416 may convert first pixel data generated by pixels in the at least two rows (e.g., an odd row and an even row) into a first digital video signal. The first ADC 416 may sequentially convert the pixel data generated from the at least two rows in a given, desired or predetermined order. The first digital video signal may be transmitted to a signal processor (not shown) and the signal processor may output video signals based on the first digital video signal.

The second image sensing unit 402 may decode pixel data generated by a second pixel array area 422. The second pixel array area 422 constitutes a second portion of the pixel array. The second image sensing unit 402 includes a third row driver 418, a fourth row driver 420, the second pixel array area 422, and a second ADC 424.

The third row driver 418 may generate a third selection signal for selecting a row (e.g., an odd row) from a plurality of rows included in the second pixel array area 422 in response to a third row address generated from a controller (not shown). The fourth row driver 420 may generate a fourth selection signal for selecting another row (e.g., an even row) from the rows included in the second pixel array area 422 in response to a fourth row address generated from a controller (not shown). The second pixel array area 422 may output pixel data generated from pixels in at least two rows (e.g., an odd row and an even row) in response to the third and fourth selection signals.

The second ADC 424 may convert second pixel data generated by pixels of the at least two rows (e.g., an odd row and an even row) into a second digital video signal. As was the case with the first ADC 416, the second ADC 424 may sequentially convert the pixel data generated from the at least two rows in a given, desired or predetermined order. The second digital video signal may be transmitted to a signal processor (not shown) and the signal processor may output video signals based on the second digital video signal.

The first through fourth selection signals may be concurrently or simultaneously generated by the first through fourth row drivers 410, 412, 418, and 420. Accordingly, the CIS 400 concurrently or simultaneously selects at least four rows of the pixel array, and decodes pixel data from the at least four rows, thereby decoding the pixel data at least four times faster than a conventional CIS such as the CIS 5 in FIG. 1.

The first through fourth row drivers 410, 412, 418, and 420 and the first and second ADCs 416 and 424 are arranged symmetrically with respect to the pixel array (414 and 422). Accordingly, the pixel array (414 and 422) is disposed at the center of the CIS 400, so that a more stable layout is achieved during the design of an image sensing system.

Figure 9:
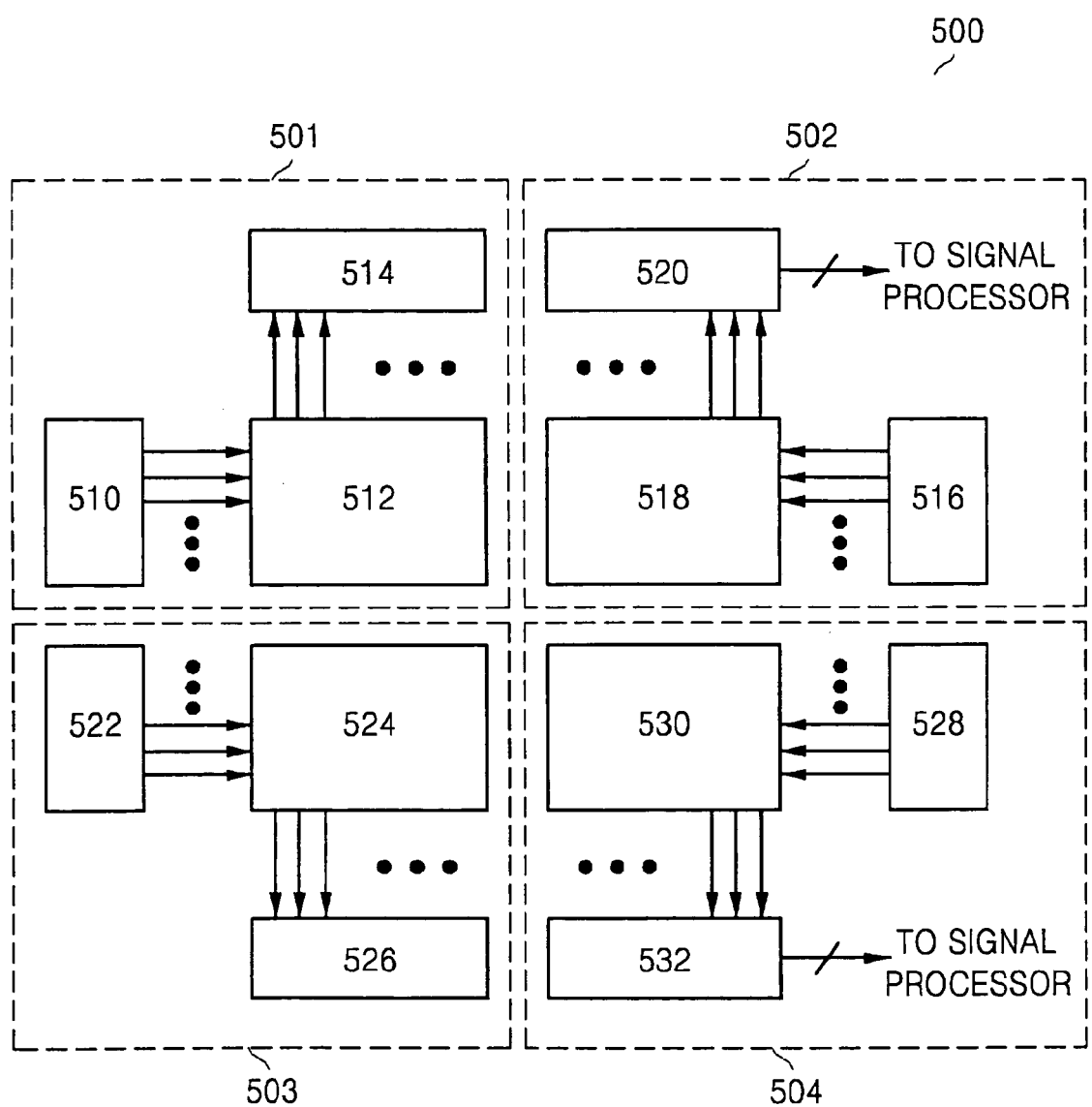
FIG. 9 is a block diagram of a CIS according to another example embodiment.

FIG. 9 is a block diagram of a CIS 500 according to still another example embodiment. Referring to FIG. 9, the CIS 500 includes first through fourth image sensing units 501, 502, 503, and 504.

The first image sensing unit 501 may decode pixel data generated by a first pixel array area 512. The first pixel array area 512 constitutes a first portion of a pixel array. The first image sensing unit 501 includes a first row driver 510, the first pixel array area 512, and a first ADC 514. The first row driver 510 may generate a first selection signal for selecting at least one row from a plurality of rows included in the first pixel array area 512 in response to a first row address generated by a controller (not shown). The first pixel array area 512 may output pixel data generated by pixels in the at least one row in response to the first selection signal. The first ADC 514 may convert first pixel data generated by pixels of the at least one rows into a first digital video signal. The first digital video signal may be transmitted to a signal processor (not shown) and the signal processor may output video signals based on the first digital video signal.

The second image sensing unit 502 includes a second row driver 516, a second pixel array area 518, which constitutes a second portion of the pixel array, and a second ADC 520. The second row driver 516 may generate a second selection signal for selecting at least one row from a plurality of rows included in the second pixel array area 518 in response to a second row address generated by a controller (not shown). The second pixel array area 518 may output pixel data generated from pixels in the at least one row in response to the second selection signal. The second ADC 520 may convert second pixel data generated by pixels of the at least one rows into a second digital video signal. The second digital video signal may be transmitted to a signal processor (not shown) and the signal processor may output video signals based on the second digital video signal.

The third image sensing unit 503 includes a third row driver 522, a third pixel array area 524, which constitutes a third portion of the pixel array, and a third ADC 526. The third row driver 522 may generate a third selection signal for selecting at least one row from a plurality of rows included in the third pixel array area 524 in response to a third row address from a controller (not shown). The third pixel array area 524 may output pixel data generated from pixels in the at least one row in response to the third selection signal. The third ADC 526 may convert third pixel data generated by pixels of the at least one rows into a third digital video signal. The third digital video signal may be transmitted to a signal processor (not shown) and the signal processor may output video signals based on the third digital video signal.

The fourth image sensing unit 504 includes a fourth row driver 528, a fourth pixel array area 530, which constitutes a fourth portion of the pixel array, and a fourth ADC 532. The fourth row driver 528 may generate a fourth selection signal for selecting at least one row from a plurality of rows included in the fourth pixel array area 530 in response to a fourth row address from a controller (not shown). The fourth pixel array area 530 may output pixel data generated by pixels in the at least one row in response to the fourth selection signal. The fourth ADC 532 may convert fourth pixel data generated by pixels of the at least one rows into a fourth digital video signal. The fourth digital video signal may be transmitted to a signal processor (not shown) and the signal processor may output video signals based on the fourth digital video signal.

The first through fourth selection signals may be concurrently or simultaneously generated by the first through fourth row drivers 510, 516, 522 and 528. Accordingly, the CIS 500 concurrently or simultaneously selects at least one row from each of the pixel array areas 512, 518, 524, and 530 of the pixel array and decodes pixel data from the selected rows, thereby decoding the pixel data faster than a conventional CIS such as the CIS 5 in FIG. 1.

The first through fourth row drivers 510, 516, 522 and 528 and the first through fourth ADCs 514, 520, 526, and 532 are arranged symmetrically with respect to the pixel array (512, 518, 524, and 530). Accordingly, the pixel array (512, 518, 524, and 530) is disposed at the center of the CIS 500, so that a more stable layout may be achieved during the design of an image sensing system.

Figure 10:
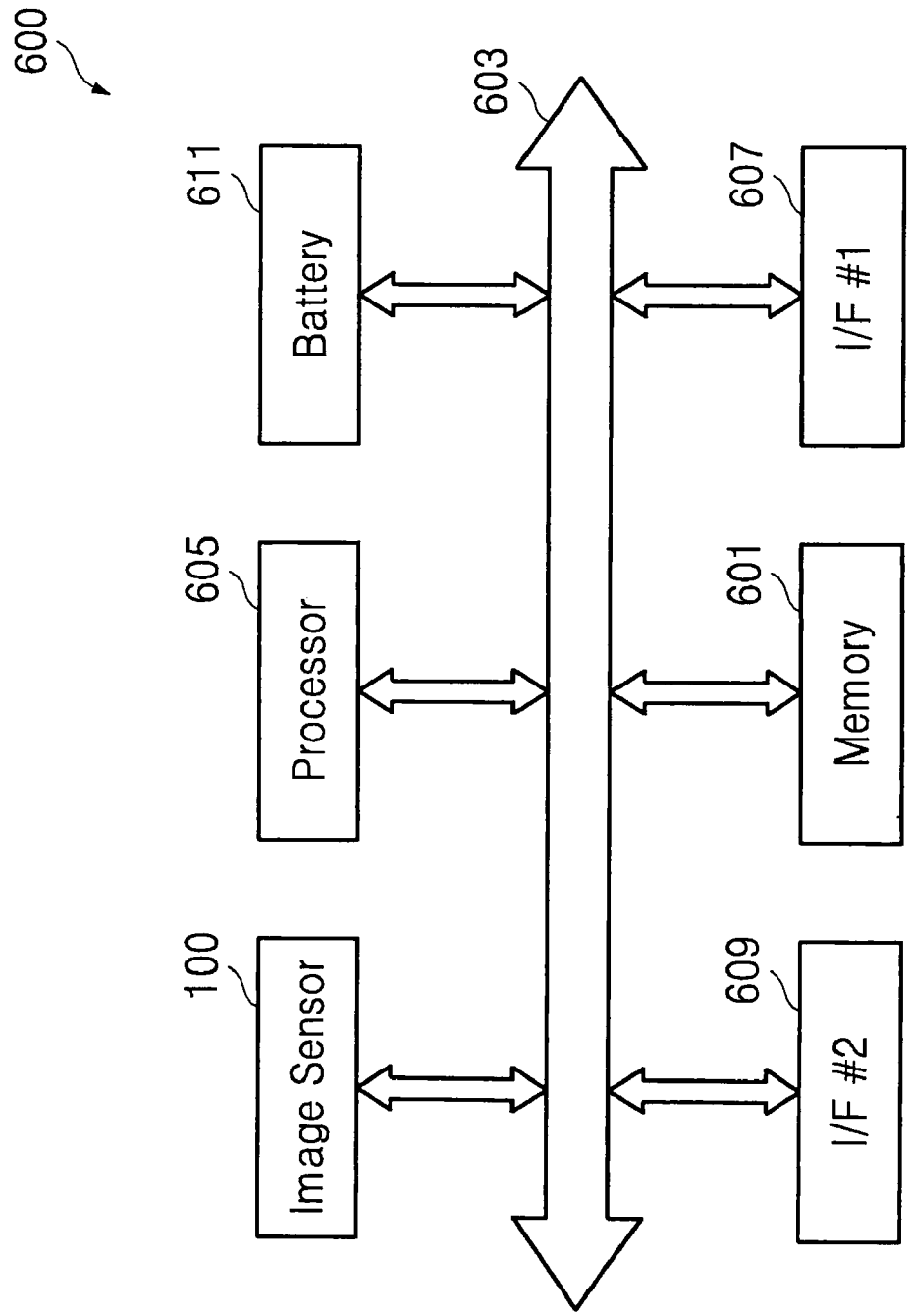
FIG. 10 is a block diagram of system including image sensor according to an example embodiment.

FIG. 10 is a block diagram of system including image sensor according to an example embodiment. Referring to FIG. 10, according to the enforcement example, in case electronic system or image sensing system 600 is embodied by portable application, electronic system 600 may include battery 611 to supply action power to image sensor (100, 150, 180, 180', 300, 400, and 500), memory device 601, and processor 605 better.

Portable application may be portable computer, digital camera, PDA (personal digital assistance), cellular telephone, MP3 player, PMP (portable multimedia player), automotive navigation system, or electronic dictionary.

Also, electronic system 600 by enforcement example of this invention may include interface, for example, input/output device 607 that do so that can exchange external data processor and data better.

Also, when electronic system 600 is a radio system, electronic system 600 may include radio interface 609 better. In this case, radio interface 609 may be connected to processor 605 and goes through system bus 603 and do outside wireless installation and data send-receive by radio.

Radio system may be PDA, lap computer, cordless phone, pager, wireless installation such as digital camera, RFID leader or RFID system. Also, radio system may be WLAN (Wireless Local Area Network) system or WPAN (Wireless Personal Area Network) system. And the radio system may be mobile phone network (Cellular Network).

Figure 11:
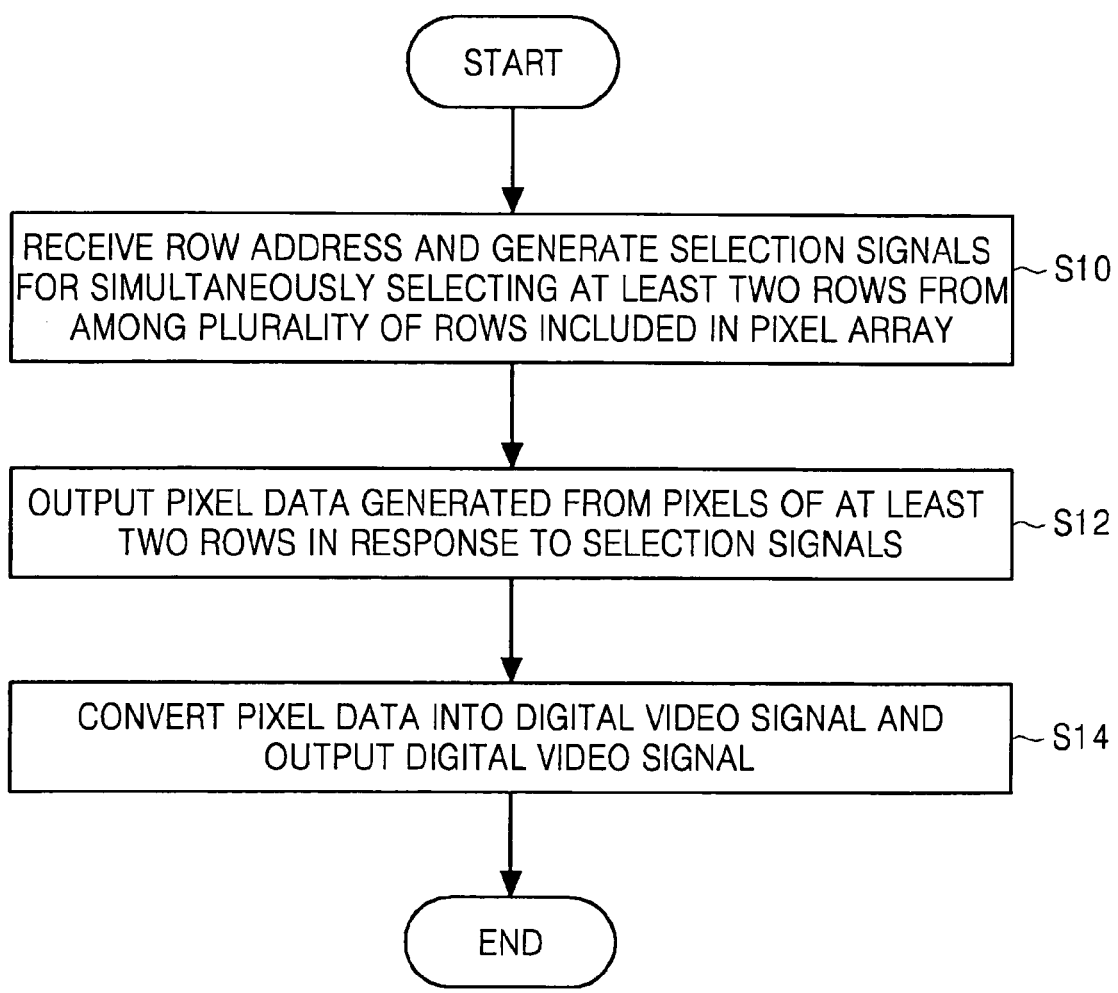
FIG. 11 is a flowchart of an image sensing method according to an example embodiment.

FIG. 11 is a flowchart of an image sensing method according to an example embodiment. The method shown illustrated in FIG. 10 will be described with regard to the image sensor shown in FIG. 3. However, this method may be applicable to other example embodiments of image sensors described herein.

Referring to FIGS. 3 and 10, at step S10 the row driver 110 receives the row address X-ADD1 and generates selection signals for concurrently or simultaneously selecting at least two rows from among the first through m-th rows included in the pixel array 120. At step S12, the pixel array 120 outputs pixel data generated from pixels of the at least two rows in response to the selection signals. At step S14, the ADC 130 converts the pixel data output from the pixel array 120 into a digital video signal and outputs the digital video signal.

As described above, according to example embodiments, at least two rows are selected from a pixel array at one time (e.g., simultaneously or concurrently) when pixel data is decoded. As a result, high-speed data output may be achieved. In addition, because a plurality of row drivers and a plurality of ADCs are arranged symmetrically with respect to the pixel array, a more stable layout may be achieved during the design of an image sensing system.

The image sensors according to example embodiments may be implemented in an image system such as a camera, mobile terminal, smart phone, personal digital assistant (PDA), or the like.

While the present invention has been particularly shown and described with reference to example embodiments thereof, it will be understood by those of ordinary skill in the art that various changes in forms and details may be made therein without departing from the spirit and scope of the present invention as defined by the following claims.

What is claimed is:

1. An image sensor comprising:
   a pixel array including a plurality of pixels arranged in a matrix of rows and columns;
   a row selection unit configured to generate selection signals for concurrently or simultaneously selecting at least two rows from the rows of the pixel array in response to a received row address; and
   an analog-to-digital conversion unit configured to convert pixel data output from the at least two rows selected from the pixel array into a digital video signal and output the digital video signal; wherein
   the pixel array outputs the pixel data in response to the selection signals.

2. The image sensor of claim 1, wherein the row selection unit comprises:
   a plurality of row drivers, each of the plurality of row drivers being configured to output selection signals for concurrently or simultaneously selecting at least two rows from one of a plurality of areas of the pixel array.

3. The image sensor of claim 1, wherein the analog-to-digital conversion unit comprises:
   a plurality of analog-to-digital converters, each of the plurality of analog-to-digital converters being configured to convert pixel data, generated from a column included in a corresponding area among a plurality of areas of the pixel array, into a digital video signal.

4. The image sensor of claim 1, wherein the analog-to-digital conversion unit comprises:
   a plurality of analog-to-digital converter units, each of the plurality of analog-to-digital converter units being configured to sequentially convert pixel data generated from at least two pixels of a corresponding column among the columns of the pixel array into a digital video signal and further configured to output the digital video signal, wherein
   the conversion by the analog-to-digital converter units is performed sequentially in a column direction.

5. The image sensor of claim 1, wherein
   the pixel data includes first pixel data and second pixel data and the digital video signal includes a first digital video signal and a second digital video signal; and the analog-to-digital conversion unit is further configured to,
   convert the first pixel data output from a first row among the at least two selected rows into the first digital video signal,
   output the first digital video signal,
   convert the second pixel data output from a second row among the at least two selected rows into the second digital video signal, and
   output the second digital video signal.

6. The image sensor of claim 1, wherein the analog-to-digital conversion unit sequentially or alternately performs analog-to-digital conversion of the pixel data output from the pixel array in a column direction.

7. An electronic system comprising the image sensor of claim 1.

8. The image sensor of claim 1, wherein the analog-to-digital conversion unit comprises:
   a plurality of analog-to-digital converter units configured to convert the pixel data output from the columns of the pixel array into the digital video signal.

9. The image sensor of claim 8, wherein the number of the analog-to-digital converter units is less than or equal to a number of the columns of the pixel array.

10. The image sensor of claim 1, wherein the row selection unit comprises:
    a first row driver and a second row driver disposed at opposite sides of the pixel array.

11. The image sensor of claim 10, wherein the analog-to-digital conversion unit comprises:
    a first analog-to-digital converter unit and a second analog-to-digital converter unit, each of the first and second analog-to-digital converter units converting pixel data from pixels in the at least two rows separately, the first and second analog-to-digital converter units being disposed at opposite sides of the pixel array.

12. The image sensor of claim 1, wherein the row selection unit comprises:
  a first row driver configured to select a first row from the rows of the pixel array; and
  a second row driver configured to select a second row from the rows of the pixel array simultaneously when the first row driver selects the first row.

13. The image sensor of claim 12, wherein the first row is an odd row and the second row is an even row.

14. The image sensor of claim 12, wherein
  the pixel data includes first pixel data and second pixel data and the digital video signal includes a first digital video signal and a second digital video signal, and wherein the analog-to-digital conversion unit includes,
  a first analog-to-digital converter unit configured to convert the first pixel data output from the first row into the first digital video signal and output the first digital video signal; and
  a second analog-to-digital converter unit configured to convert the second pixel data output from the second row into the second digital video signal and output the second digital video signal.

15. The image sensor of claim 1, wherein the pixel array includes a plurality of pixel array areas, each of the plurality of pixel array areas having a corresponding row selection unit and analog-to-digital conversion unit.

16. The image sensor of claim 15, wherein each row selection unit is configured to generate selection signals for concurrently or simultaneously selecting at least two rows from rows of a corresponding pixel array area in response to a received row address, and each analog-to-digital conversion unit is configured to convert pixel data output from the at least two rows selected from the corresponding pixel array area into a corresponding digital video signal.

17. The image sensor of claim 15, wherein
  the pixel data output from the corresponding pixel array area includes first pixel data and second pixel data and the corresponding digital video signal includes a first digital video signal and a second digital video signal; and
  each analog-to-digital conversion unit is further configured to,
    convert the first pixel data output from a first row among the at least two rows selected from the corresponding pixel array area into the first digital video signal,
    output the first digital video signal,
    convert the second pixel data output from a second row among the at least two rows selected from the corresponding pixel array area into the second digital video signal, and
    output the second digital video signal.

18. An image sensing method for image sensor, the method comprising;
  generating selection signals for concurrently or simultaneously selecting at least two rows from a plurality of rows of a pixel array in response to a received row address, the pixel array including a plurality of pixels arranged in a matrix of rows and columns;
  outputting pixel data in response to the selection signals;
  converting the output pixel data into a digital video signal; and
  outputting the digital video signal.

19. The image sensing method of claim 18, wherein the selection signals are signals for concurrently or simultaneously selecting at least two rows from one of a plurality of areas of the pixel array.

20. The image sensing method of claim 18, wherein the digital video signal is converted pixel data, generated from a column included in a corresponding area among a plurality of areas of the pixel array.

* * * * *